United States Patent
Lee (10) Patent No.: US 8,239,853 B2
(45) Date of Patent: Aug. 7, 2012

(54) METHOD OF DISPLAYING ATTACHMENT FILE LIST IN MOBILE COMMUNICATION TERMINAL, METHOD OF DOWNLOADING AND UPLOADING ATTACHMENT FILE USING E-MAIL PROTOCOL, AND MOBILE COMMUNICATION TERMINAL FOR PERFORMING THE SAME

(75) Inventor: Sang Ho Lee, Miryang-si (KR)

(73) Assignee: LG Electronics Inc., Seoul (KR)

( * ) Notice: Subject to any disclaimer, the term of this patent is extended or adjusted under 35 U.S.C. 154(b) by 1234 days.

(21) Appl. No.: 11/953,191

(22) Filed: Dec. 10, 2007

(65) Prior Publication Data

US 2008/0172663 A1 Jul. 17, 2008

(30) Foreign Application Priority Data

Jan. 16, 2007 (KR) .................. 10-2007-0004729

(51) Int. Cl.
*G06F 9/44* (2006.01)
(52) U.S. Cl. .................. 717/173; 717/169; 707/822
(58) Field of Classification Search .................. None
See application file for complete search history.

(56) References Cited

U.S. PATENT DOCUMENTS

| | | | | |
|---|---|---|---|---|
| 7,882,188 B2 * | 2/2011 | Ban et al. | ...... | 709/206 |
| 7,895,282 B1 * | 2/2011 | Wang et al. | ...... | 709/206 |
| 2002/0198862 A1 * | 12/2002 | Bellmann | ...... | 707/1 |
| 2005/0038863 A1 * | 2/2005 | Onyon et al. | ...... | 709/207 |
| 2005/0198166 A1 * | 9/2005 | Kawaji | ...... | 709/206 |
| 2007/0033588 A1 * | 2/2007 | Landsman | ...... | 717/178 |
| 2007/0100978 A1 * | 5/2007 | Levi et al. | ...... | 709/223 |
| 2008/0065878 A1 * | 3/2008 | Hutson et al. | ...... | 713/153 |
| 2008/0189373 A1 * | 8/2008 | Ikonen et al. | ...... | 709/206 |
| 2008/0222127 A1 * | 9/2008 | Bergin | ...... | 707/5 |
| 2009/0031244 A1 * | 1/2009 | Brezina et al. | ...... | 715/781 |
| 2009/0068994 A1 * | 3/2009 | Murphy | ...... | 455/414.1 |
| 2009/0138547 A1 * | 5/2009 | Boudreau | ...... | 709/203 |
| 2009/0265763 A1 * | 10/2009 | Davies et al. | ...... | 726/3 |

* cited by examiner

*Primary Examiner* — Hung T Vy
*Assistant Examiner* — Hua Lu
(74) *Attorney, Agent, or Firm* — Birch, Stewart, Kolasch & Birch, LLP (57) ABSTRACT

A method of displaying an attachment file list in a mobile communication terminal comprises receiving a message, selecting an attachment file list view menu in order to check entire attachment files comprised in the message, and extracting the attachment files comprised in the message and then displaying a list of the extracted attachment files.

11 Claims, 7 Drawing Sheets

METHOD OF DISPLAYING ATTACHMENT FILE LIST IN MOBILE COMMUNICATION TERMINAL, METHOD OF DOWNLOADING AND UPLOADING ATTACHMENT FILE USING E-MAIL PROTOCOL, AND MOBILE COMMUNICATION TERMINAL FOR PERFORMING THE SAME

CROSS-REFERENCE TO RELATED APPLICATIONS

This nonprovisional application claims priority under 35 U.S.C. §119(a) on Patent Application No. 10-2007-0004724 filed in Republic of Korea on Jan. 16, 2007, the entire contents of which are hereby incorporated by reference.

BACKGROUND OF THE INVENTION

1. Field of Invention

A mobile communication terminal, computer program product and Method of exchanging and displaying an attachment file and list using an e-mail protocol 2. Related Art Conventional mobile communication terminals are typically capable of transmitting and receiving a character message, a multimedia message, an e-mail message, and so on in addition to performing voice communication functions.

When a user of a conventional mobile communication terminal wants to execute a specific media file of media files attached to a received e-mail message, the user checks the received e-mail message one by one, finds the desired specific media file, and executes the corresponding media file.

That is, because the user cannot check at a single time whether a media file requested by the user is embedded within any e-mail message, the user must check the received e-mail messages one by one.

Further, if the user of a conventional terminal selects a specific e-mail message in order to check a media file attached to the e-mail message, the entire contents of the selected e-mail message, e.g., a mail body, a receiver field, a sender field, a date field, a title field are typically displayed to the user. Thus, the user is burdened with reviewing extraneous data when the user's intention is to check only the media file attached to the e-mail message.

SUMMARY

A computer program product, communications terminal and method of displaying an attachment file list in a mobile communication terminal that can extract entire attachment files embedded in or attached to each of a set of received messages and then display the extracted attachment files separately from the corresponding messages.

A computer program product, communications terminal and method of downloading and uploading an attachment file using an e-mail protocol so as to more conveniently download or upload the attachment file embedded in the e-mail message.

BRIEF DESCRIPTION OF THE DRAWINGS

The implementation of this document will be described in detail with reference to the following drawings in which like numerals refer to like elements.

DETAILED DESCRIPTION

Hereinafter, an implementation of this document will be described in detail with reference to the attached drawings.

Figure 1:
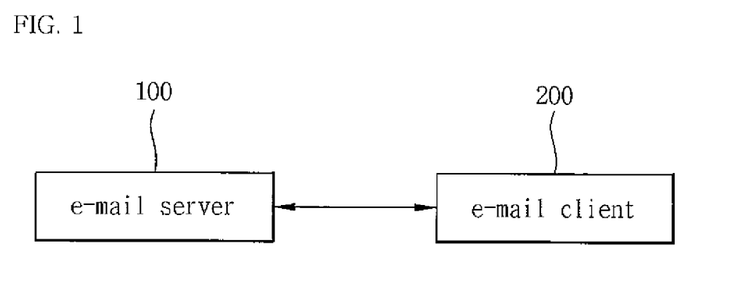
FIG. 1 is a diagram illustrating a structure of an e-mail system for applying this document.

FIG. 1 is a diagram illustrating a structure of an e-mail system for applying this document.

Referring to FIG. 1, the e-mail system comprises an e-mail server 100 and an e-mail client 200. The e-mail server 100 receives and stores e-mail messages transmitted from a transmitting terminal (not shown) and then transmits the e-mail messages to the e-mail client 200. The e-mail client 200 includes a mailbox corresponding to a user's mail account and a mobile communication terminal in which the mail account is provided.

The e-mail server 100 transmits e-mail messages to the e-mail client 200 via one of a pull type transmission protocol and a push type transmission protocol.

The pull type protocol is a protocol in which the e-mail server 100 transmits an e-mail message to the e-mail client 200 when a request for downloading a message is received from the e-mail client 200.

Alternatively, the push type protocol is a protocol in which the e-mail server 100 transmits an e-mail message to the e-mail client 200 independent of any request for downloading from the e-mail client 200.

Figure 2:
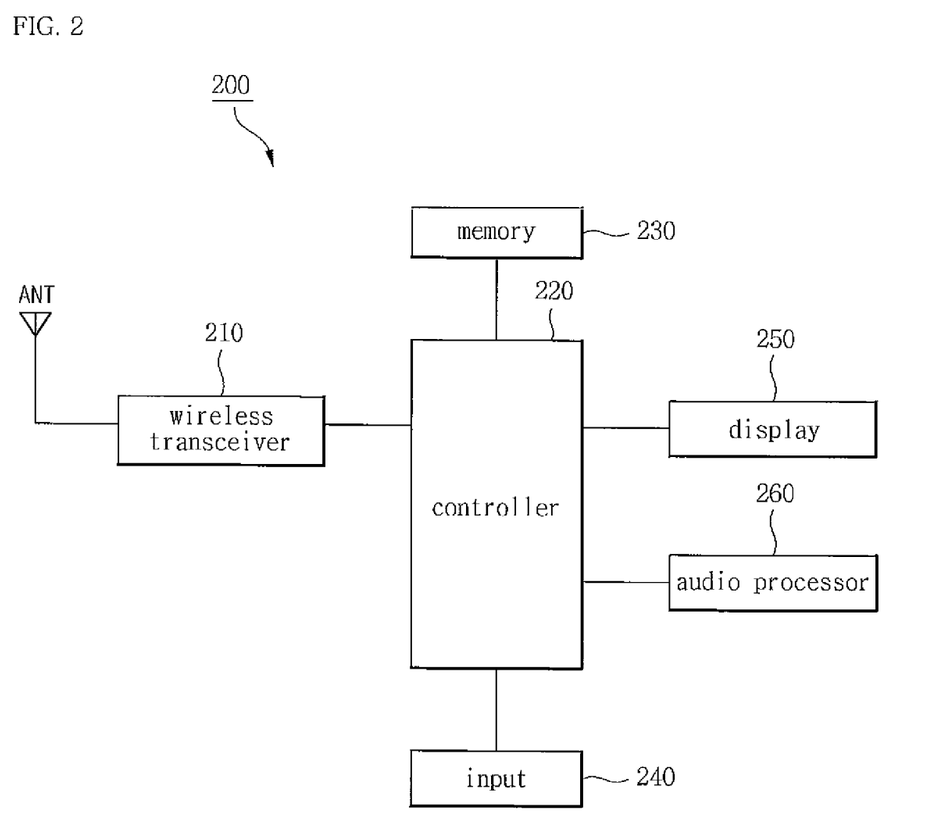
FIG. 2 is a block diagram illustrating of a mobile communication terminal in an implementation of this document.

FIG. 2 is a block diagram illustrating a configuration of a mobile communication terminal in an implementation of this document.

Referring to FIG. 2, the mobile communication terminal 200 comprises a wireless transceiver 210, a controller 220, a memory 230, an input 240, a display 250, and an audio processor 260.

The wireless transceiver 210 performs a communication function of the mobile communication terminal 200. The terminal 200 communicates to other terminals via a base station (not shown) connected to a wired and/or unwired network (not shown).

In one embodiment, the wireless transceiver 210 transmits a request for downloading or uploading an attachment file of the mobile communication terminal 200 to the e-mail server 100 and receives data related to the attachment file from the e-mail server 100.

The controller 220 performs control of the mobile communication terminal 200.

In an embodiment of the invention, the controller 220 controls the terminal so as to extract entire attachment files embedded in e-mail messages stored in the memory 230 and then to display a list of the extracted attachment files in the display 250.

Further, in another embodiment of the invention, the controller 220 controls the terminal so as to generate a specific instruction for requesting a download of a file name using an e-mail protocol and requesting the terminal transmit the generated instruction to the e-mail server 10 through the wireless transceiver 210.

Further, the controller 220 controls the terminal so as to generate a specific instruction for requesting a download of an attachment file using the e-mail protocol and to transmit the generated instruction to the e-mail server 10 through the wireless transceiver 210.

The memory 230 includes a program memory and a data memory. In the program memory, programs for controlling the entire operation of the mobile communication terminal 200 are stored.

In an implementation of this document, the memory 230 stores IMAP4 software for downloading from the e-mail server 100 an attachment file embedded in an e-mail message or for uploading the attachment file to the e-mail server 100. Further, the memory 230 stores setting information about whether to download the e-mail message with a pull type or a push type protocol.

The input 240 includes various buttons for inputting numeral and character information and function buttons for setting various functions. The input 240 can be embodied with a keypad, a jog dial, a touch screen, and a joy stick.

In another embodiment of the invention, the input 240 is configured to receive one of a request to download a file name, a request to download a file content, a request to download an e-mail message, a request to upload a file, a request for an attachment file list, or so on from a user, and transfers the request to the controller 220.

The display 250 outputs various display information and various menu screens from the mobile communication terminal 200 and comprises a Liquid Crystal Display (LCD) or an Organic Light Emitting Diode (OLED).

In another embodiment of the invention, the controller 220 controls the display 250 to display a download menu screen and an upload menu screen. The download menu screen includes a "file name download" menu/option, a "file content download" menu/option, and an "e-mail message download" menu/option.

Further, the controller 220 controls the display 250 to display a list of attachment files embedded in each of the received messages.

The audio processor 260 performs a function of playing an audio signal decoded and output from the controller 220 through a speaker or transmitting an audio signal generated from a microphone to the controller 220.

Figure 3:
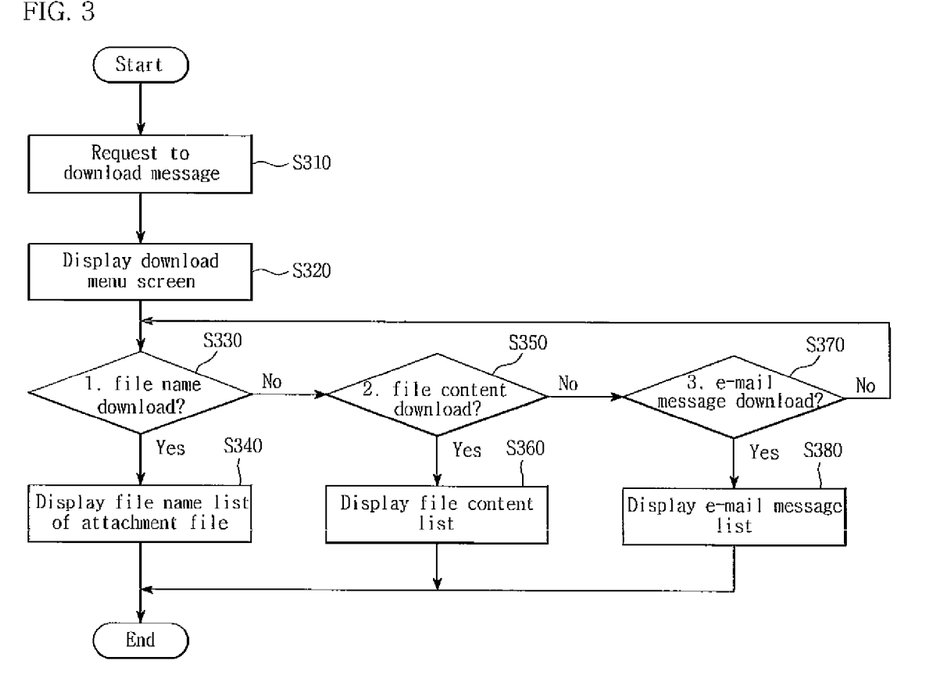
FIG. 3 is a flowchart illustrating a method of downloading an attachment file using an e-mail protocol in an implementation of this document.

FIG. 3 is a flowchart illustrating a method of downloading an attachment file using an e-mail protocol according to one embodiment of the invention.

Referring to FIG. 3, if a user requests to download an attachment file or an e-mail message (S310), a download menu screen for downloading the attachment file or the e-mail message from the e-mail server 100 is displayed (S320). The user can request to download the attachment file or the e-mail message by selecting the corresponding menu icon. Further, a hot key for immediately entering a download menu screen may be provided in the mobile communication terminal 200.

Figure 4:
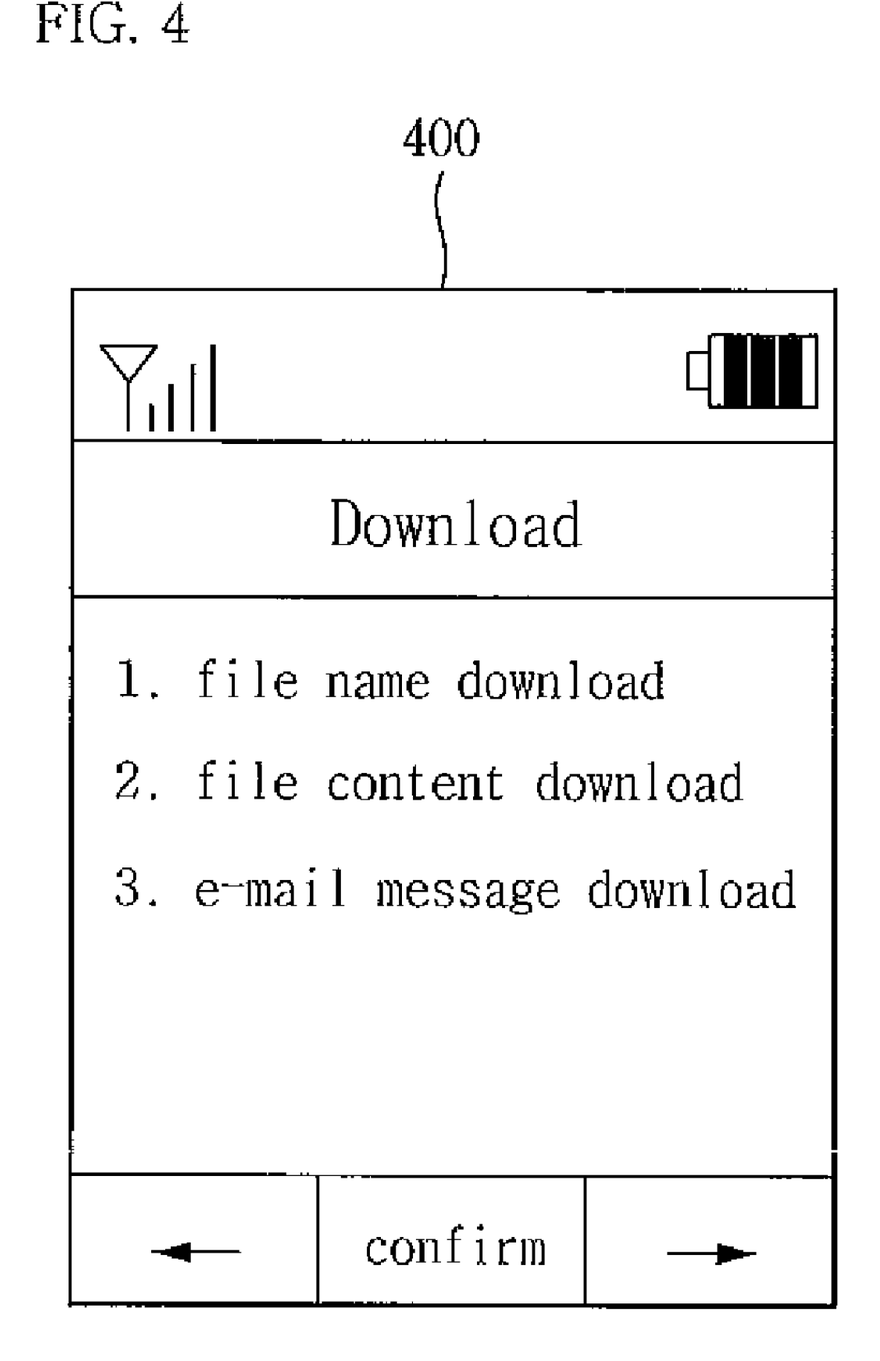
FIG. 4 is a diagram illustrating a download menu screen in an implementation of this document.

FIG. 4 is a diagram illustrating a download menu screen in one embodiment of the invention.

Referring to FIG. 4, the download menu screen 400 includes a "file name download" menu, a "file content download" menu, and an "e-mail message download" menu.

If the user selects the "file name download" menu through the input 240 (S330), a list of file names corresponding to the attachment files embedded in or attached to the e-mail messages stored in the server's mailbox is displayed in the display 250 (S340).

Steps S330 and S340 are in more detail described.

If the user selects the "file name download" menu, the controller 220 sends a request to transmit file names of attachment files embedded in or attached to received e-mail messages to the e-mail server 100 through the wireless transceiver 210.

In more detail, the mobile communication terminal 200 transmits an instruction to the e-mail server 100 using an IMAP 4 protocol to request that the e-mail server transmit a file name of any and all attachment files that are attached to e-mail messages stored in the server. In a variant, file names of attachments to a subset of all messages may requested. The subset may be the most recent e-mail, unopened emails, emails with a selected priority, emails from a selected sender ID, or other subset criteria. In the general case, the instruction transmitted by the mobile communication terminal 200 is as follows.

Tag fetch [UID] bodystructure
EX)
Lg001 fetch 1 bodystructure
Lg001 fetch 2 bodystructure
Lg001 fetch 3 bodystructure
. . .
. . .
Lg001 fetch N bodystructure In the instruction, the "Lg001" is an alphanumeric tag. The "fetch" is an instruction for bringing data of a specific mail, and numerals displayed with "1, 2, . . . N" are an UID and indicate an inherent ID of an e-mail message. The "bodystructure" is an instruction for requesting a part that corresponds to a known or assigned name of an attachment file in a structure of the e-mail body.

After the instruction is transmitted from the mobile communication terminal 200 to the e-mail server 100, the e-mail server 100 transmits a body structure for each of the e-mail messages, but not the emails themselves, to the mobile communication terminal 200.

After parsing and extracting only a name of the attachment file from a body structure received from the e-mail server 100, the controller 220 of the mobile communication terminal 200 controls the display 250 to display a file name list of the extracted attachment file.

Figure 5:
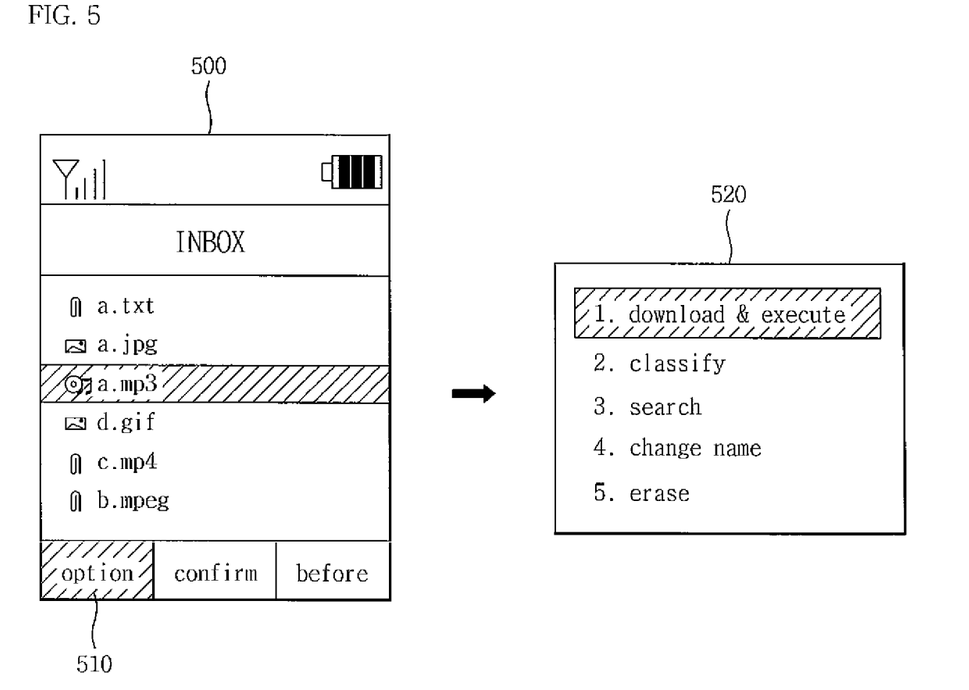
FIG. 5 is a menu screen illustrating a file name list of an attachment file in an implementation of this document.

FIG. 5 is a menu screen illustrating a "file name" list of attachment files according to an embodiment of the invention.

Referring to FIG. 5, only the list of file names 500 of the attachment files embedded in the stored e-mail messages is displayed in a receiving message box (INBOX), rather than a list of the e-mail messages themselves as is common in conventional systems.

When the "file name" list 500 of the attachment files is displayed, a user can position a cursor at a particular attachment file to download that file using a vertical directional key. After the cursor is positioned at a specific attachment file name, if the user selects an option menu 510, a pop-up window 520 comprising sub-menus is displayed. Alternatively, the pop-up window 520 can be displayed immediately upon positioning the cursor over the name, without using option window 510.

If the user selects "download & execution", the content of the attachment file name is downloaded from the e-mail server 100 and is then executed in the terminal.

At this time, in order to download from the e-mail server 100 and execute one attachment file selected by the user via pop-up window 520, the mobile communication terminal 200 transmits the following instruction to the e-mail server 100.

Tag fetch [UID] body.PEEK [number]

In an e-mail with a body, a "number" of a first attachment file embedded in the e-mail becomes 2, and in an e-mail with no body, a "number" of a first attachment file comprised in the e-mail becomes 1.

Referring back to FIG. 4, if the user selects "file content download" through the input 240 in the download menu screen of FIG. 4 (S350), the mobile communication terminal 200 downloads file content for all e-mails from the e-mail server 100, without executing the downloaded files, and displays a list of the downloaded file content in the display 250 (S360).

The file content is downloaded from the e-mail server 100 to the mobile communication terminal 200 using an IMAP4 protocol.

In more detail, if the user selects "file content download," the controller 220 requests the e-mail server 100 transmit an attachment file embedded in the e-mail messages. An instruction to perform the request is as follows.

Tag fetch [UID] rfc822.text
EX)
Lg001 fetch 1 rfc822.text
Lg001 fetch 2 rfc822.text
Lg001 fetch 3 rfc822.text
. . .
. . .
Lg001 fetch N rfc822.text In the instruction, "Lg001" is an alpha-numeric tag. The "fetch" command is an instruction for bringing data of a specific mail, and numerals displayed with "1, 2, . . . N" are an UID which indicates an inherent II) of an e-mail message. The "rfc822.text" is an optional fetch instruction, and is an instruction for requesting complete attachment files (information and data) of a specific email.

After the instruction is transmitted from the mobile communication terminal 200 to the e-mail server 100, the e-mail server 100 then transmits the attachment files along with selected metadata to the mobile communication terminal 200.

The controller 220 of the mobile communication terminal 200 causes the terminal to parse and extract information about each downloaded attachment file and then to display a list of the extracted attachment file information on the display 250.

Figure 6:
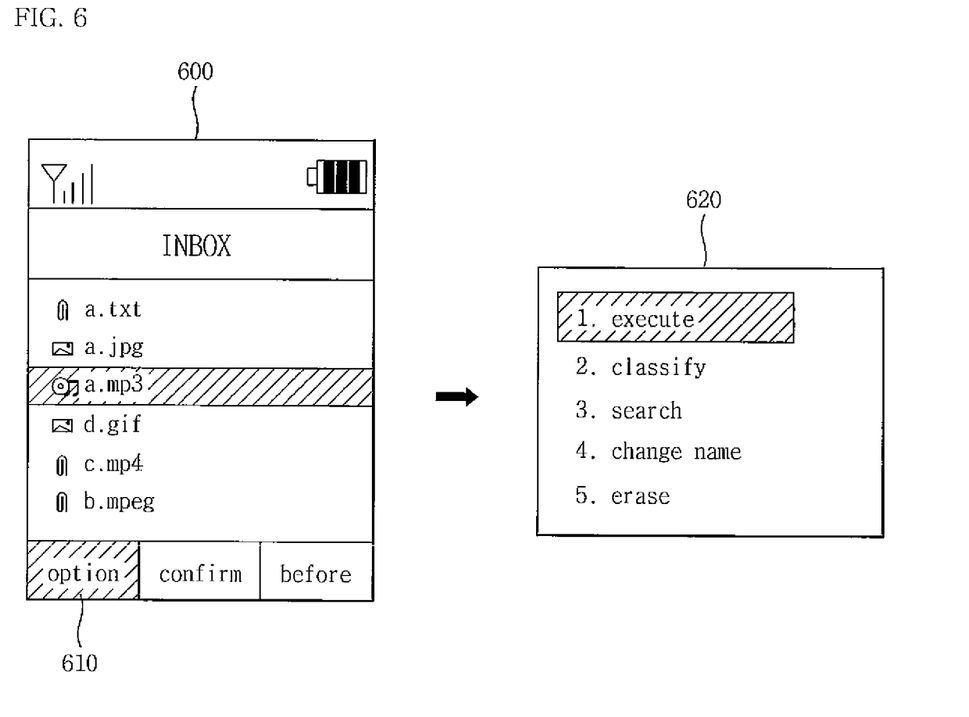
FIG. 6 is a menu screen illustrating an attachment file list in an implementation of this document.

FIG. 6 is a menu screen illustrating an attachment file list of an embodiment of the invention.

Referring to FIG. 6, only a list 600 of attachment files attached to the e-mail messages is displayed in a receiving message box (INBOX), rather than a conventional list of e-mail messages themselves.

When attachment file list 600 is displayed, a user can position a cursor at the wanted attachment file using a vertical directional key. After the cursor is positioned on a specific attachment file, the user can select an option menu 610, and a pop-up window 620 comprising sub-menus is displayed. Alternatively, the pop-up window 620 can be displayed immediately upon positioning the cursor over the name, without using option window 610.

The sub-menu is an "execution" menu and is different from the previously described "download & execution" menu, shown in FIG. 5.

Because the list 600 of the attachment files embedded in the e-mail message is displayed in the display 250, the user can select specific attachment files for downloading, execution or processing.

In the download menu screen 400 of FIG. 4, if the user selects an "e-mail message download" menu, the mobile communication terminal 200 requests that the e-mail server 100 transmit the received e-mail message to terminal 200.

When the e-mail server 100 transmits the e-mail message to mobile communication terminal 200, the mobile communication terminal 200 stores the e-mail mail messages in the display 250.

Figure 7:
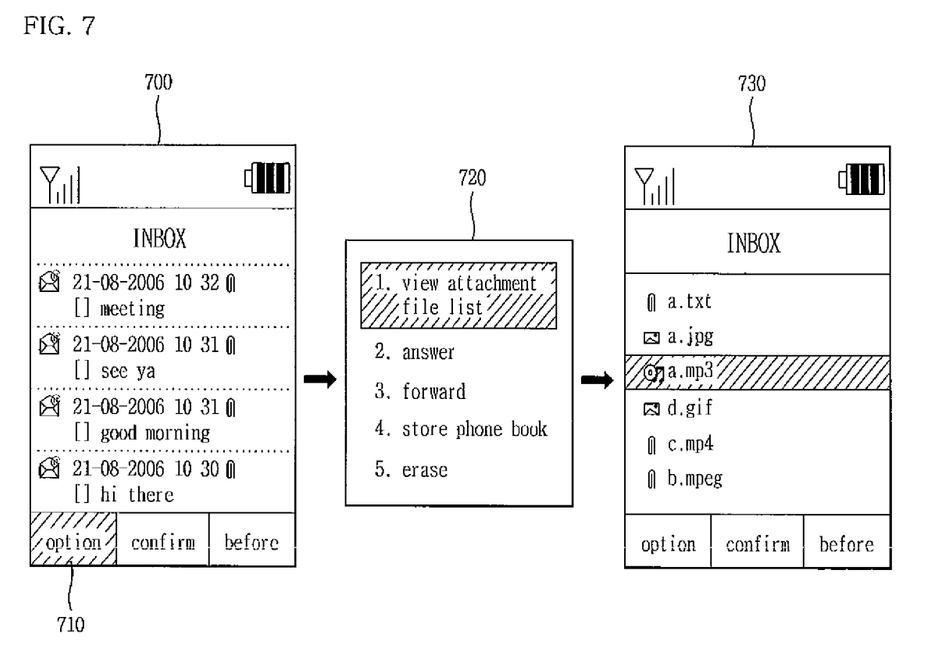
FIG. 7 is a diagram illustrating a list of e-mail messages in an implementation of this document.

FIG. 7 is a diagram illustrating a list of e-mail messages in an implementation of this document.

Referring to FIG. 7, as in the conventional art, the user can check header information of the corresponding e-mail and an attachment file embedded in the e-mail by selecting a specific e-mail from the e-mail message list 700.

Further, if the user selects an option menu 710 positioned at a left side of a lower end of the e-mail message list 700, a pop-up window 720 comprising an "attachment file list view" menu is displayed. Alternatively, the pop-up window 720 can be displayed immediately upon positioning the cursor over the name, without using option window 710. If the user selects "attachment file list view," a list 730 of the attachment file is displayed.

In one embodiment of the invention, after the e-mail messages having the attachment files are received from the e-mail server 100, the attachment files are parsed and extracted through an "attachment file list view" request, and then a list of the extracted attachment files is displayed.

In the previously described embodiments, the e-mail message or attachment file is downloaded via a pull type protocol, but the invention is not limited thereto. That is, the user can set the e-mail message to download by the push type protocol. According to the push type protocol, the user can preset whether to download any one of an attachment file name, an attachment file, or an actual e-mail message from the e-mail server 100.

Figure 8:
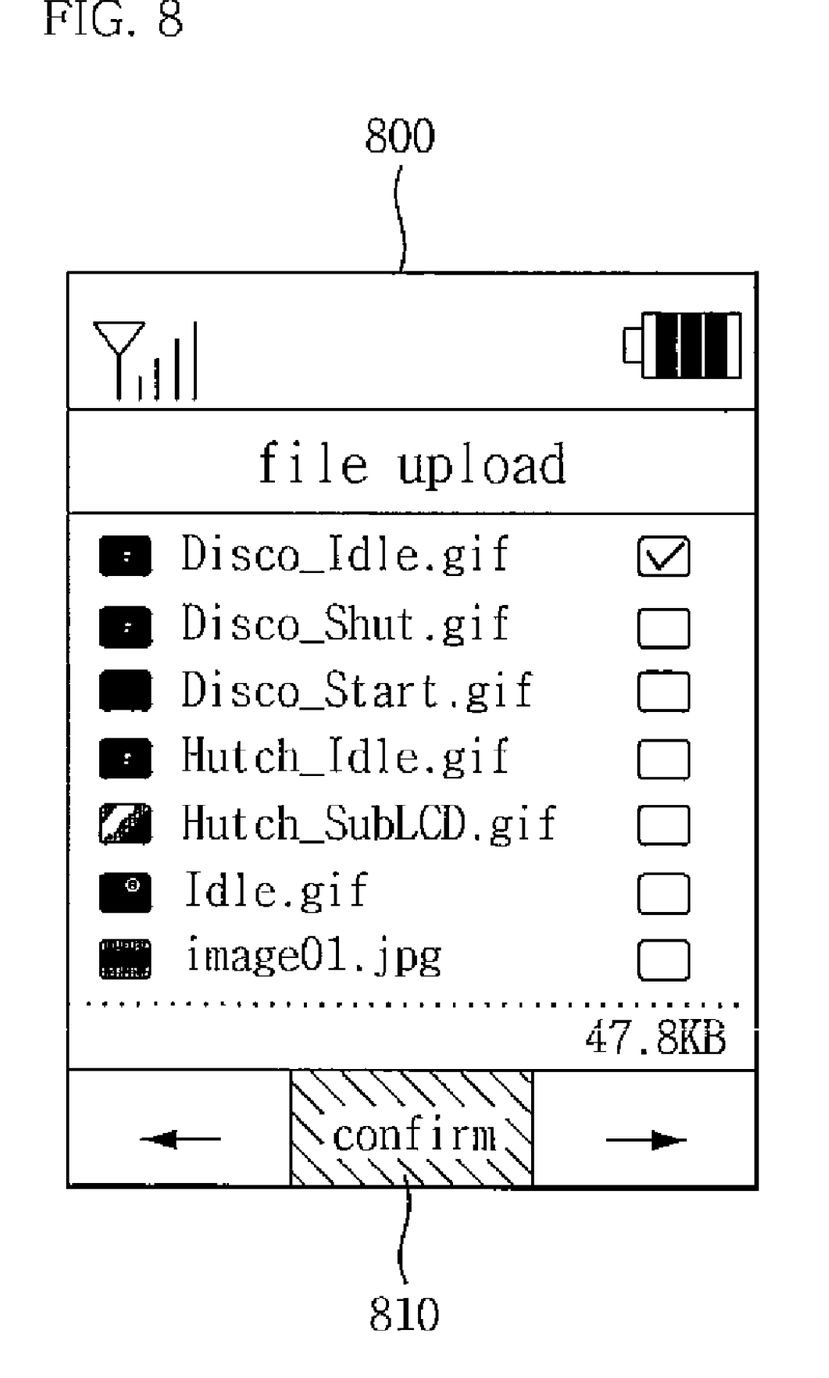
FIG. 8 is a diagram illustrating a menu screen for uploading an attachment file in an implementation of this document.

FIG. 8 is a diagram illustrating a menu screen for uploading an attachment file according to an embodiment of the invention.

If the user requests to upload the attachment file stored in the mobile communication terminal 200 to the e-mail server 100, a menu screen 800 shown in FIG. 8 is displayed in the display 250.

The menu screen 800 includes a list of attachment files to upload. A check box for selecting a specific attachment file is provided at a right side of each attachment file. Other locations may also be used.

If the user selects an attachment file to upload using the check box and then clicks a confirm menu 810, the mobile communication terminal 200 uploads the selected attachment file to the e-mail server 100 using an Append instruction of an IMAP4 protocol.

In more detail, the mobile communication terminal transmits an instruction for requesting to upload the selected attachment file to the e-mail server 100. In order to upload the attachment file, an instruction in which the mobile communication terminal 200 transmits is as follows.

Tag Append folder_name (/flags) {mail size}

This instruction is an instruction for adding a mail to the corresponding folder of an IMAP4 account. The attachment file can be uploaded by transmitting the instruction to the e-mail server 100.

In this embodiment, an e-mail message is described as an example of a message that includes an attachment file. However, the previously described techniques can be applied to a multimedia message that can includes an attachment file.

The present invention may be practiced in software stored on a computer readable medium such as a disk or computer memory device. A description of how a computer works is found in "How Computers Work," Ron White, Que Publishing, 8th Edition, November 2005, the entire contents of which being incorporated herein by reference.

As described above, in one embodiment of the invention, because a list of all attachment files embedded in the received message are displayed, it is possible to reduce inconvenience to the user caused by checking messages one by one in order to find an attachment file.

The invention being thus described, it will be obvious that the same may be varied in many ways. Such variations are not to be regarded as a departure from the spirit and scope of the invention, and all such modifications as would be obvious to one skilled in the art are intended to be comprised within the scope of the following claims.

What is claimed is:

1. A method of displaying information in a mobile communication terminal, the method comprising:
without downloading, from a message server, messages held by the message server and attachment files attached to the messages, downloading file names of the attachment files from the message server;
without displaying the messages or a list of the messages, displaying a file name list of the attachment files;
selecting one or more files from the displayed file name list; and
wirelessly downloading the selected one or more files from the message server, without downloading the messages.

2. The method of claim 1, further comprising:
without requesting to transmit the messages and the attachment files to the message server, requesting to transmit the file names of the attachment files to the message server.

3. A mobile communication terminal, comprising:
a wireless communication unit configured to download, from a message server, file names of attachment files attached to messages held by the message server, without downloading the messages and the attachment files from the message server;
a display unit configured to display a file name list of the attachment files, without displaying the messages or a list of the messages; and
an input unit configured to select one or more files from the displayed file name list,
wherein the wireless communication unit is configured to download the selected one or more files from the message server, without downloading the messages.

4. The mobile communication terminal of claim 3, wherein the input unit is configured to request to transmit the file names of the attachment files to the message server, without requesting to transmit the messages and the attachment files to the message server.

5. A mobile communication terminal, comprising:
an input unit configured to request to transmit attachment files attached to messages to a message server, without requesting to transmit the messages to the message server;
a wireless communication unit configured to download the attachment files from the message server, without downloading the messages from the message server; and
a display unit configured to display a list of the attachment files, without displaying the messages or a list of the messages.

6. A method of displaying information in a mobile communication terminal, the method comprising:
displaying a graphic user interface for selecting one of a file name download menu, a file download menu, and a message download menu;
selecting one of the file name download menu, the file download menu, and the message download menu via the graphic user interface;
downloading, from a message server, file names of attachment files attached to messages held by the message server without downloading the messages and the attachment files from the message server, when the file name download menu is selected;
displaying a file name list of the attachment files without displaying the messages or a list of the messages,
selecting one or more files from the displayed file name list; and
wirelessly downloading the selected one or more files from the message server without downloading the messages.

7. The method of claim 6, further comprising:
downloading the attachment files without downloading the messages, when the file download menu is selected; and
displaying the file name list of the attachment files without displaying the messages or the list of the messages.

8. The method of claim 6, further comprising:
downloading the messages without downloading the attachment files, when the message download menu is selected; and
displaying the message list of the messages without displaying the attachment files or the file name list.

9. A mobile communication terminal, comprising:
a display unit configured to display a graphic user interface for selecting one of a file name download menu, a file download menu, and a message download menu;
an input unit configured to select one of the file name download menu, the file download menu, and the message download menu via the graphic user interface;
a wireless communication unit configured to download, from a message server, file names of attachment files attached to messages held by the message server without downloading the messages and the attachment files from the message server, when the file name download menu is selected;
a controller configured to
display a file name list of the attachment files on the display unit without displaying the messages or a list of the messages, and
wirelessly download one or more files from the message server without downloading the messages when the one or more files are selected from the displayed file name list.

10. The mobile communication terminal of claim 9, wherein the controller is configured to
download the attachment files without downloading messages when the file download menu is selected, and
display the file name list of the attachment files on the display unit without displaying the messages or the list of the messages.

11. The mobile communication terminal of 9, wherein the controller is configured to
download the messages without downloading the attachment files when the message download menu is selected, and
display the message list of the messages without displaying the attachment files or the file name list.

* * * * *